(12) United States Patent
Xu

(10) Patent No.: US 10,999,865 B2
(45) Date of Patent: May 4, 2021

(54) DATA TRANSMISSION METHOD, DEVICE, COMPUTER PROGRAM AND CARRIER THEREOF

(71) Applicant: GUANGDONG OPPO MOBILE TELECOMMUNICATIONS CORP., LTD., Dongguan (CN)

(72) Inventor: Jing Xu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/924,043

(22) Filed: Jul. 8, 2020

(65) Prior Publication Data
US 2020/0337080 A1 Oct. 22, 2020

Related U.S. Application Data

(63) Continuation of application No. PCT/CN2019/072934, filed on Jan. 24, 2019.

(60) Provisional application No. 62/621,576, filed on Jan. 24, 2018, provisional application No. 62/676,323, filed on May 25, 2018.

(51) Int. Cl.
H04W 72/04 (2009.01)
H04W 72/14 (2009.01)
H04W 76/27 (2018.01)
H04L 1/00 (2006.01)
(Continued)

(52) U.S. Cl.
CPC .......... H04W 72/14 (2013.01); H04L 1/0003 (2013.01); H04W 52/146 (2013.01); H04W 52/242 (2013.01); H04W 72/0493 (2013.01); H04W 76/27 (2018.02)

(58) Field of Classification Search
None
See application file for complete search history.

(56) References Cited

U.S. PATENT DOCUMENTS

| 2013/0195031 | A1 | 8/2013 | Hessler et al. | |
| 2019/0373588 | A1* | 12/2019 | Bae | H04W 76/27 |
| 2020/0022174 | A1* | 1/2020 | Karaki | H04W 72/1284 |

FOREIGN PATENT DOCUMENTS

| CN | 102158981 A | 8/2011 |
| EP | 2312883 A1 | 4/2011 |
| WO | WO2014/070049 A1 | 5/2014 |

OTHER PUBLICATIONS

Ericsson, "General HARQ Aspects of SPS UL," 3GPP TSG-RAN WG2 #AH, Tdoc R2-1707175, Qingdao, P.R. of China, Jun. 30, 2017, 3 pgs.
(Continued)

Primary Examiner — Ayanah S George
(74) Attorney, Agent, or Firm — Morgan, Lewis & Bockius LLP

(57) ABSTRACT

A data transmission method performed by a device, wherein the device is separately configured by RRC with a plurality of parameters configured for configured grant transmission and with the plurality of parameters configured for dynamic transmission which is triggered by UL grant, the method comprising: transmitting data using the plurality of parameters configured for configured grant transmission; when retransmission of the data is triggered by UL grant, retransmitting the data using a part of the plurality of parameters configured for the configured grant transmission.

17 Claims, 2 Drawing Sheets

(51) Int. Cl.
  *H04W 52/14* (2009.01)
  *H04W 52/24* (2009.01)

(56) References Cited

OTHER PUBLICATIONS

Guangdong OPPO Mobile Telecommunications Corp. Ltd., International Search Report and Written Opinion, PCT/CN2019/072934, dated Apr. 24, 2019, 7 pgs.
3GPP TS 38.213 V1.0.0 (Sep. 2017), Physical layer procedures for control (Release 15), 3rd Generation Partnership Project; Technical Specification Group Radio Access Network; NR, 16 pgs.
3GPP TS 38.214 V2.0.0 (Dec. 2017), Physical layer procedures for data (Release 15), 3rd Generation Partnership Project; Technical Specification Group Radio Access Network; NR, 71 pgs.
3GPP TS 38.331 V1.0.0 (Dec. 2017), Radio Resource Control (RRC) Protocol specification (Release 15), 3rd Generation Partnership Project; Technical Specification Group Radio Access Network, NR, 100 pgs.
3GPP TS 38.321 V2.0.0 (Dec. 2017), Medium Access Control (MAC) protocol specification (Release 15), 3rd Generation Partnership Project; Technical Specification Group Radio Access Network; NR, 55 pgs.
Guangdong OPPO Mobile Telecommunications Corp. Ltd., Extended European Search Report, EP19744366.6, dated Dec. 15, 2020, 8 pgs.

\* cited by examiner

DATA TRANSMISSION METHOD, DEVICE, COMPUTER PROGRAM AND CARRIER THEREOF

CROSS-REFERENCE TO RELATED APPLICATION

This application is a continuation application of PCT Application No. PCT/CN2019/072934, filed Jan. 24, 2019, which is based on and claims priority of U.S. Application No. 62/621,576, filed Jan. 24, 2018, and U.S. Application No. 62/676,323, filed May 25, 2018, the entire contents of these applications are incorporated herein by reference.

TECHNICAL FIELD

The present disclosure relates to wireless communication protocol.

BACKGROUND

The statements in this section merely provide background information related to the present disclosure and may not constitute prior art. Further, the content in this section may be used to define a concept related to the invention.

For data transmission from a device, e.g., a user equipment (UE), to a network side device, e.g., a base station, the radio resource control, RRC, parameters may be configured.

The parameters of such an uplink data transmission can be configured by the network side device through semi-static or semi-persistent configuration, and/or through dynamic configuration.

In the semi-static or semi-persistent configuration, the values configured for the parameters are used for relatively long time without being frequently updated, which on one side saves the resources for updating the parameter values and on the other side may not be able to adapt the data transmission according to the changes of the wireless channel characteristics in real time.

In the dynamic configuration, the values configured for the parameters are updated more frequently according to the changes of the wireless channel characteristics.

SUMMARY

A method, a device, and a computer program and a carrier thereof for data transmission are provided.

According to a first aspect of the present disclosure, a data transmission method is performed by a device, wherein the device is separately configured by radio resource control (RRC) with a plurality of parameters configured for configured grant transmission and with a plurality of parameters configured for dynamic transmission which is triggered by uplink (UL) grant, the method including: transmitting data using the plurality of parameters configured for configured grant transmission; and when retransmission of the data is triggered by UL grant, retransmitting the data using a part of the plurality of parameters configured for the configured grant transmission.

According to a second aspect of the present disclosure, a data transmission device, separately configured by radio resource control (RRC) with a plurality of parameters configured for configured grant transmission and with a plurality of parameters configured for dynamic transmission which is triggered by uplink (UL) grant, comprises one or more processors and one or more memory storing program instructions, the data transmission device being adapted, when the program instructions are executed by the one or more processors, to perform the aforementioned data transmission method.

According to a third aspect of the present disclosure, a non-transitory computer-readable storage medium stores program instructions that, when executed by one or more processors in a data transmission device separately configured by radio resource control (RRC) with a plurality of parameters configured for configured grant transmission and with a plurality of parameters configured for dynamic transmission which is triggered by uplink (UL) grant, cause the data transmission device to perform the aforementioned data transmission method.

BRIEF DESCRIPTION OF THE DRAWINGS

The drawings are merely for illustration purposes but not for limiting the invention.

DETAILED DESCRIPTION

Figure 1:
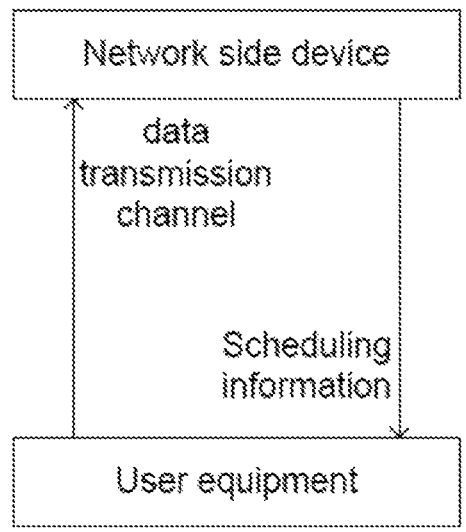
FIG. 1 A schematic view of the communication between a network side device and a UE.

After a device, e.g., a UE, registers to a network side device, e.g., a base station, the network side device may send semi-static or semi-persistent scheduling information to the UE, so that the UE can be configured with a data transmission channel, e.g., an uplink channel, for transmitting data to the network side device, as shown in FIG. 1. This semi-static or semi-persistent configuration can also be called as "configured grant".

For example, modulation and coding scheme (MCS) should be configured for the data transmission channel. A plurality of MCS index tables is stored in the network side device, while the same plurality of MCS index tables is also stored in the UE. The network side device may indicate in the semi-static or semi-persistent scheduling information the identifier of the MCS index table, e.g. by MCS table A, out of the plurality of the MCS index tables to be used for configuring the data transmission channel. For another example, the network side device may indicate in the semi-static or semi-persistent scheduling information one or more power control parameters as well as the values thereof for configuring the data transmission channel.

Further, after the UE registers to a network side device, the network side device may send also dynamic scheduling information to the UE, informing the UE the parameters to be used in a dynamic transmission, as shown in FIG. 1. Such a dynamic configuration can also be called as "UL grant", wherein UL refers to uplink.

For example, the network side device may indicate in the dynamic scheduling information the identifier of the MCS index table, e.g. by MCS table B, out of the plurality of the MCS index tables to be used for configuring the data transmission channel in a dynamic transmission. During the dynamic transmission, the network side device may send further dynamic scheduling information to the UE indicating the values of the parameters inside the MCS index table, which is conducted dynamically for each transport block (TB) for the data so that the values of the parameters can be updated according to the changes of the wireless channel characteristics in real time. For another example, the network side device may indicate in the dynamic scheduling information one or more power control parameters as well as the values thereof for configuring the data transmission channel in the dynamic transmission.

In view of the above, the semi-static or semi-persistent scheduling information and the dynamic scheduling information may have some overlapping parameters, for example, both may have the mcs-Table for indicating the MCS index table to be used, and/or both may have the same power control parameter. On the other side, each one of the semi-static or semi-persistent scheduling information and the dynamic scheduling information may have one or more parameters which are not included in the other, that is, one or more non-overlapping parameters, due to the different characteristics between the semi-statically or semi-persistently configured channel and dynamically configured channel.

When the UE is sending data to the network side device through a data transmission channel configured semi-statically or semi-persistently, a transmission failure may occur. After detecting such a failure, it may be determined by the network side device to retransmit the failed data through a dynamically configured transmission instead of the semi-statically or semi-persistently configured transmission.

In this case, some transmission configurations, such as MCS table, are RRC configured for configured grant resource and dynamic resource separately. However, when retransmission of data in configured grant resource is trigged by UL grant, it is confusing to refer to which RRC configuration.

That is, among the overlapping parameters, the semi-static or semi-persistent scheduling information may indicate the UE to use MCS table A whereas and the dynamic scheduling information may indicate the UE to use MCS table B, while the semi-static or semi-persistent scheduling information may indicate the UE to use Power control parameter Po A whereas the dynamic scheduling information may indicate the UE to use Power control parameter Po B.

It is a question which one of MCS table A and MCS table B should be used for the dynamically configured transmission and which one of PoA and Po B should be used for the dynamically configured transmission.

The answer to this question seems to be obvious: MCS table B and Po B should be used for the dynamically configured transmission since they are from the dynamic scheduling information.

However, the inventor of the present invention found that the above answer does not necessarily bring the best transmission quality for the retransmission, since the parameters and their values in the dynamic scheduling information do not always bring a robust transmission compared to the corresponding parameters and their values in the semi-static or semi-persistent scheduling information for satisfying the reliability of an Ultra-Reliable Low-Latency Communication (URLLC).

Therefore, when retransmission of configured grant transmission is trigged by UL grant (dynamic transmission), partial or full of the RRC parameters for configured grant transmission is still used for retransmission trigged by UL grant (dynamic transmission).

For example, MCS table A is configured for configured grant transmission, and MCS table B is configured for dynamic transmission. Data is transmitted in configured grant resource at first, in which MCS table A is used. When the data is trigged by UL grant for retransmission, in which MCS table A is still used.

For example, MCS table A and Power control parameter Po A are configured for configured grant transmission, and MCS table B and Power control parameter Po B are configured for dynamic transmission. Data is transmitted in configured grant resource at first, in which MCS table A and Power control parameter Po A are used. When the data is trigged by UL grant for retransmission, in which MCS table A and Power control parameter Po A are still used.

For example, MCS table A and Power control parameter Po A are configured for configured grant transmission, and MCS table B and Power control parameter Po B are configured for dynamic transmission. Data is transmitted in configured grant resource at first, in which MCS table A and Power control parameter Po A are used. When the data is trigged by UL grant for retransmission, in which MCS table A and Power control parameter Po B are still used.

Figure 2:
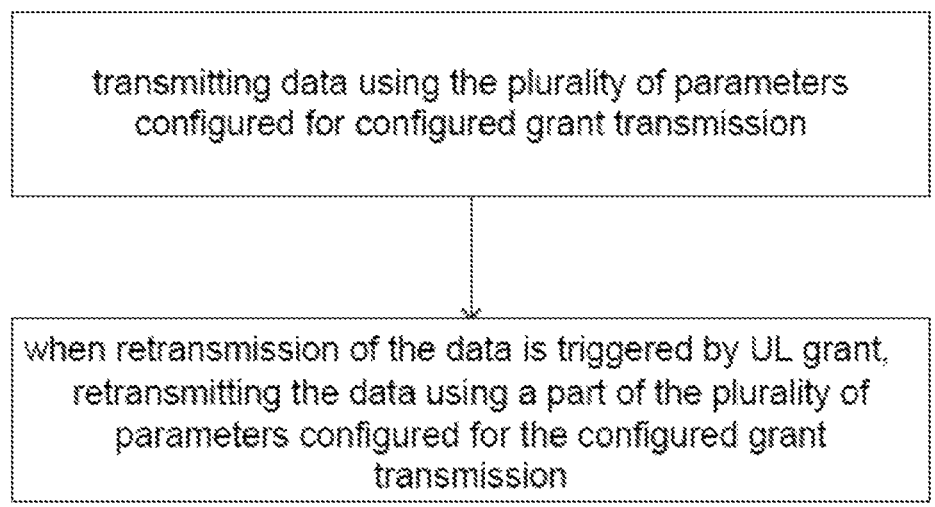
FIG. 2 A flow chart of the method.

In other words, as shown in FIG. 2, a data transmission method performed by a device, in which the device is separately configured by RRC with a plurality of parameters configured for configured grant transmission and with the plurality of parameters configured for dynamic transmission which is triggered by UL grant, comprises the step of: transmitting data using the plurality of parameters configured for configured grant transmission; when retransmission of the data is triggered by UL grant, retransmitting the data using a part of the plurality of parameters configured for the configured grant transmission.

The plurality of parameters may comprise MCS table; when the retransmission of the data is triggered by the UL grant, retransmitting the data using the MCS table configured for the configured grant transmission.

The plurality of parameters may comprise MCS table and Power control parameter Po; when the retransmission of the data is triggered by the UL grant, retransmitting the data using the MCS table and the Power control parameter Po configured for the configured grant transmission.

The plurality of parameters comprise MCS table and Power control parameter Po; when the retransmission of the data is triggered by the UL grant, retransmitting the data using the MCS table configured for configured grant transmission and the Power control parameter Po configured for dynamic transmission.

In general, the more robust parameters are used to satisfy the reliability of URLLC.

The following specific examples may improve the understanding, but not for limiting the invention.

In 5G wireless communication system, the network side device may be a base station, in particular a gNodeB or gNB as mentioned in 3GPP TS 38.214. A UE may transmit uplink data through a physical uplink shared channel, PUSCH, to the gNB.

A PUSCH transmission can be a dynamic transmission dynamically scheduled or triggered by an UL grant, e.g., in a DCI (Downlink control information). The PUSCH transmission can also be a semi-static or semi-persistent transmission corresponding to a configured grant Type 1 or configured grant Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. That is, the configuration of the PUSCH can be completed with the values of the parameters set in configuredGrantConfig. The configured grant Type 2 PUSCH transmission is semi-persistently scheduled by an UL grant in a valid activation DCI according to 3GPP TS 38.213 after the reception of higher layer parameter configuredGrantConfig not including rrc-ConfiguredUplinkGrant. That is, besides the values set in the configuredGrantConfig, the configuration of the PUSCH further needs the values of parameters set in the UL grant.

When data is transmitted in a semi-static or semi-persistent transmission corresponding to a configured grant, the parameters applied for the transmission may be provided by configuredGrantConfig.

When a retransmission of the data is needed, the retransmission may be a dynamic transmission triggered by UL grant, for which the parameters applied for the retransmission may be provided by pusch-Config.

Each of the pusch-Config, the configuredGrantConfig for Type 1 and the configuredGrantConfig for Type 2 includes many parameters for configuring the PUSCH as listed in Table-1. There are different situations of the parameters:

1. Some parameters are only specified in pusch-Config but not defined in the configuredGrantConfig for Type 1 or in the configuredGrantConfig for Type 2, e.g., tp-pi2BPSK.

2. Some parameters are specified in pusch-Config while the configuredGrantConfig for Type 1 and the configuredGrantConfig for Type 2 simply indicate "Corresponding to the parameter specified in pusch-Config", e.g., dataScramblingIdentityPUSCH.

3. Some parameters are not specified in pusch-Config but defined in the configuredGrantConfig for Type 1 and in the configuredGrantConfig for Type 2, e.g., nrofHARQ-Processes.

4. Some parameters are specified in each of the pusch-Config, the configuredGrantConfig for Type 1 and the configuredGrantConfig for Type 2, either using the same name, e.g., mcs-Table, or using different names, e.g., DMRS-UplinkConfig in pusch-Config but cg-DMRS-Configuration in the configuredGrantConfig for Type 1 and in the configuredGrantConfig for Type 2.

TABLE 1

| Parameter | pusch-Config | configuredGrantConfig for Type 1 | configuredGrantConfig for Type 2 |
|---|---|---|---|
| dataScramblingIdentityPUSCH | Specified in pusch-Config | Corresponding to the parameter specified in pusch-Config | Corresponding to the parameter specified in pusch-Config |
| txConfig | Specified in pusch-Config | Corresponding to the parameter specified in pusch-Config | Corresponding to the parameter specified in pusch-Config |
| DMRS-UplinkConfig | Specified in pusch-Config | Specified as cg-DMRS-Configuration in ConfiguredGrantConfig | Specified as cg-DMRS-Configuration in ConfiguredGrantConfig |
| codebookSubset | Specified in pusch-Config | Corresponding to the parameter specified in pusch-Config | Corresponding to the parameter specified in pusch-Config |
| maxRank | Specified in pusch-Config | Corresponding to the parameter specified in pusch-Config | Corresponding to the parameter specified in pusch-Config |
| rbg-Size | Specified in pusch-Config | Specified in ConfiguredGrantConfig | Specified in ConfiguredGrantConfig |
| frequencyHopping | Specified in pusch-Config | Specified in ConfiguredGrantConfig | Specified in ConfiguredGrantConfig |
| periodicity | Not defined | Specified in ConfiguredGrantConfig | Specified in ConfiguredGrantConfig |
| configuredGrantTimer | Not defined | Specified in ConfiguredGrantConfig | Specified in ConfiguredGrantConfig |
| timeDomainOffset | Not defined, DCI indicates | Specified in rrc-ConfiguredUplinkGrant | DCI indicates |
| timeDomainAllocation | Not defined, DCI indicates | Specified in rrc-ConfiguredUplinkGrant | DCI indicates |
| frequencyDomainAllocation | Not defined, DCI indicates | Specified in rrc-ConfiguredUplinkGrant | DCI indicates |
| antennaPort | DCI indicates | Specified in rrc-ConfiguredUplinkGrant | DCI indicates |
| dmrs-SeqInitialization | DCI indicates | Specified in rrc-ConfiguredUplinkGrant | DCI indicates |
| precodingAndNumberOfLayers | DCI indicates | Specified in rrc-ConfiguredUplinkGrant | DCI indicates |
| srs-ResourceIndicator | DCI indicates | Specified in rrc-ConfiguredUplinkGrant | DCI indicates |
| mcsAndTBS | DCI indicates | Specified in rrc-ConfiguredUplinkGrant | DCI indicates |
| codeBlockGroupTransmission | Specified in PUSCH-ServingCellConfig | Not dedicated defined but can be referred to when DCI is scrambled with CS-RNTI | Not dedicated defined but can be referred to when DCI is scrambled with CS-RNTI |
| frequencyHoppingOffsetLists | Specified in pusch-Config and DCI indicates | Specified as frequencyHoppingOffset in rrc-ConfiguredUplinkGrant | Specified in pusch-Config and DCI indicates |

TABLE 1-continued

| Parameter | pusch-Config | configuredGrantConfig for Type 1 | configuredGrantConfig for Type 2 |
|---|---|---|---|
| msg3-transformPrecoder | Specified in RACH-ConfigCommon | Not dedicated defined, with corresponding UE behavior specified in section 6.1.3 TS38.214 | Not dedicated defined, with corresponding UE behavior specified in section 6.1.3 TS38.214 |
| tpc-Accumulation | Specified in PUSCH-PowerControl | Not dedicated defined, with corresponding UE behavior specified in section 7.1.1 TS38.213 | Not dedicated defined, with corresponding UE behavior specified in section 7.1.1 TS38.213 |
| p0-NominalWithoutGrant | Specified in PUSCH-PowerControl | Specified in PUSCH-PowerControl | Specified in PUSCH-PowerControl |
| P0-PUSCH-Alpha | Specified as p0-AlphaSets in PUSCH-PowerControl | Specified in ConfiguredGrantConfig | Specified in ConfiguredGrantConfig |
| powerControlLoopToUse | Specified as in PUSCH-PowerControl | Specified in ConfiguredGrantConfig | Specified in ConfiguredGrantConfig |
| PUSCH-PathlossReferenceRS | Specified in PUSCH-PowerControl | Specified as pathlossReferenceIndex in rrc-ConfiguredUplinkGrant | Specified in PUSCH-PowerControl |
| deltaMCS | Specified in PUSCH-PowerControl | Not dedicated defined | Not dedicated defined |
| SRI-PUSCH-PowerControl | Specified in PUSCH-PowerControl and indicates by SRI field in DC | Indicated by srs-ResourceIndicator Specified in rrc-ConfiguredUplinkGrant | Specified in PUSCH-PowerControl and indicates by SRI field in DC |

In above situation 4, each of the parameters as shadowed in Table-1, being called as the overlapping parameters, may be configured with different values in the pusch-Config and in the configuredGrantConfig for Type 1 or the configuredGrantConfig for Type 2.

The transmission of data through semi-static or semi-persistent transmission uses the parameters specified in configuredGrantConfig for Type 1 or Type 2. The data may need to be retransmitted due to different reasons, e.g., when a failure occurs during the transmission of the data through semi-static or semi-persistent transmission. The detection of the failure can be carried out by any known detection mechanisms and thus the present invention should not be limited by any specific detection mechanism. A data retransmission may be triggered by UL grant, i.e., the retransmission of the data uses dynamic transmission which is normally configured by pusch-Config.

However, as mentioned above, some parameters such as the identifier of the MCS index table (mcs-Table) are specified in both pusch-Config and configuredGrantConfig for Type 1 or Type 2. Thus, it is a question which one of the mcs-Tables should be used for the dynamic transmission.

The answer to this question seems to be obvious: the mcs-Table specified in the pusch-Config should be used for the dynamic transmission since it is dedicated for the dynamic transmission.

However, the inventor of the present invention found that the above answer does not necessarily bring the best transmission quality for the retransmission, since the parameters specified for the dynamic transmission are not always the more robust ones compared to the corresponding parameters specified for semi-static or semi-persistent transmission for satisfying the reliability of an Ultra-Reliable Low-Latency Communication (URLLC).

In view of the above finding, for the overlapping parameters, the more robust values of the parameters, no matter being specified in the pusch-Config for the dynamic transmission or being specified in the configuredGrantConfig for the semi-static or semi-persistent transmission, should be chosen for configuring the dynamic transmission, so that the reliability and latency of the retransmission of the data can be better guaranteed.

For example, for the overlapping parameters mcs-Table and mcs-TableTransformPrecoder, which together can be called as MCS Table, the configuredGrantConfig for semi-static or semi-persistent transmission may specify an MCS table A while the pusch-Config for dynamic transmission of the retransmission may specify an MCS table B. In this case, the MCS table A used for the data transmission should still be used for the data retransmission since the MCS table A provides a more robust configuration. Concerning the sub-parameters inside the MCS index table indicated by the mcs-Table in the MCS table A, the corresponding values can be dynamically configured through pusch-Config, since pusch-Config is sent more frequently to from the network device to the UE for each data segment of the data to be retransmitted.

For example, for the overlapping parameters p0-PUSCH-Alpha, powerControlLoopToUse, and pathlossReferenceIndex, which together can be called as Power control parameter Po, the configuredGrantConfig for semi-static or semi-persistent transmission may specify a Power control parameter Po A while the pusch-Config for dynamic transmission of the retransmission may specify a Power control parameter Po B. In this case, the Power control parameter Po A used for the data transmission should still be used for the data retransmission since the Power control parameter Po A provides a more robust configuration.

For example, for the overlapping parameter transformPrecoder, the configuredGrantConfig for semi-static or semi-persistent transmission may specify a transformPrecoder A while the pusch-Config for dynamic transmission of the retransmission may specify a transformPrecoder B. In this case, the transformPrecoder A used for the data transmission should still be used for the data retransmission since the transformPrecoder A provides a more robust configuration.

In short, a part of the overlapping parameters specified in the configuredGrantConfig for semi-static or semi-persistent transmission, which provide a more robust configuration, are still used for dynamic transmission for the data retransmission.

The part of the overlapping parameters may comprise at least one of the following parameters in 3GPP TS 38.214: mcs-Table, mcs-TableTransformPrecoder, p0-NominalWithoutGrant, p0-PUSCH-Alpha, powerControlLoopToUse, pathlossReferenceIndex, transformPrecoder.

The part of the overlapping parameters may consist of the following parameters in 3GPP TS 38.214: mcs-Table, mcs-TableTransformPrecoder, p0-NominalWithoutGrant, p0-PUSCH-Alpha, powerControlLoopToUse, pathlossReferenceIndex, transformPrecoder. That is, when the retransmission of the data is triggered by UL grant, the data is retransmitted using all the parameters configured for dynamic transmission except for the part of the overlapping parameters.

The part of the overlapping parameters may consist of the following parameters in 3GPP TS 38.214: mcs-Table, mcs-TableTransformPrecoder, p0-PUSCH-Alpha, powerControlLoopToUse, pathlossReferenceIndex, transformPrecoder. That is, when the retransmission of the data is triggered by UL grant, the data is retransmitted using all the parameters configured for dynamic transmission except for the part of the overlapping parameters.

Above mentioned standard documents such as 3GPP TS 38.214 and 3GPP TS 38.213 and the related standard documents 3GPP TS 38.331 and 3GPP TS 38.321, as well as other standard documents cited therein, together describe the related complex technologies in the 5G system. The contents in these standard documents can enable a person skilled in the art to carry out the present invention.

Further, it is provided a device, which is adapted to carry out the method described above.

Figure 3:
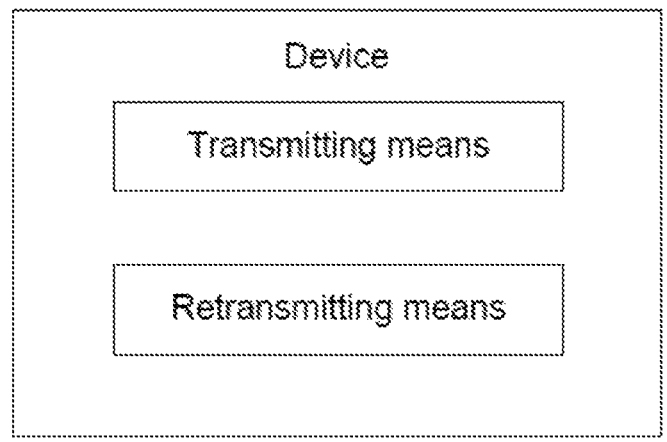
FIG. 3 A block diagram of a device.

The device may comprise transmitting means, adapted to transmit data using the plurality of parameters configured for configured grant transmission; and retransmitting means, adapted, when retransmission of the data is triggered by UL grant, to retransmit the data using a part of the plurality of parameters configured for the configured grant transmission, as shown in FIG. 3.

Figure 4:
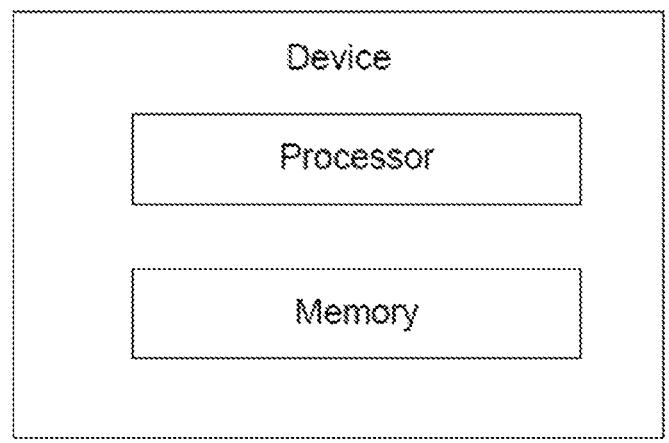
FIG. 4. A block diagram of another device.

The device may comprise one or more processors and one or more memory storing program instructions, and is adapted, when the program instructions are executed by the one or more processors, to carry out the method described above. FIG. 4 shows an example of such a device with one processor and one memory.

Further, it is provided a computer program containing program instructions which, when executed by one or more processors in a device, cause the device to carry out the method described above.

Further, it is provided a carrier for carrying the above computer program. The carrier can be any medium that is able to carry the computer program, e.g., a computer-readable medium.

It is apparent to those skilled in the art that the function, means, module, unit, device or system described above may be implemented using hardware, software, or a combination thereof. For a hardware implementation, they may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other suitable electronic units, or a selective combination thereof. For a software implementation, a computer program and/or codes may be written in any suitable programming language, carried by a carrier such as a suitable computer-readable media, and executed by one or more controllers or processors. The computer-readable medium may be one or more of ROM, RAM, CD-ROM, magnetic tape, floppy disc, optical data storage device, and the like. In addition, the data described above may be a message with a technical structure including the corresponding information. The message may be an electronic message in analog form or digital form which can be sent or received by an electronic device. The message may be carried by a carrier, for example by a computer-readable media as mentioned above, or by a communication channel, such as a wireless communication channel or a wired communication channel, in the form of electric signal, electromagnetic wave or any other suitable form.

It should be understood that the invention is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

The invention claimed is:

1. A data transmission method performed by a device, wherein the device is separately configured by radio resource control (RRC) with a plurality of parameters configured for configured grant transmission and with a plurality of parameters configured for dynamic transmission which is triggered by uplink (UL) grant, the method comprising:
    transmitting data using the plurality of parameters configured for configured grant transmission; and
    when retransmission of the data is triggered by UL grant, retransmitting the data using a part of the plurality of parameters configured for the configured grant transmission.

2. The data transmission method of claim 1, wherein the plurality of parameters configured for configured grant transmission comprises a modulation coding scheme (MCS) table;
    when the retransmission of the data is triggered by the UL grant, retransmitting the data using the MCS table.

3. The data transmission method of claim 1, wherein the plurality of parameters configured for configured grant transmission comprises a MCS table and a Power control parameter Po;
    when the retransmission of the data is triggered by the UL grant, retransmitting the data using the MCS table and the Power control parameter Po.

4. The data transmission method of claim 1, wherein the plurality of parameters configured for configured grant transmission comprises a MCS table and the plurality of parameters configured for dynamic transmission comprises a Power control parameter Po;
    when the retransmission of the data is triggered by the UL grant, retransmitting the data using the MCS table and the Power control parameter Po.

5. The data transmission method of claim 1, wherein the device is a user equipment, UE, and the data is transmitted and retransmitted by the UE to a network side device.

6. The data transmission method of claim 2, wherein the MCS table comprises mcs-Table and mcs-TableTransformPrecoder in 3GPP TS 38.214.

7. The data transmission method of claim 3, wherein the Power control parameter Po comprises at least one of p0-PUSCH-Alpha, powerControlLoopToUse, and pathlossReferenceIndex in 3GPP TS 38.213.

8. The data transmission method of claim 1, wherein the data is transmitted and retransmitted through a physical uplink shared channel, PUSCH.

9. The data transmission method of claim 1, wherein the configured grant transmission is a semi-static or a semi-persistent transmission.

10. The data transmission method of claim 1, wherein the plurality of parameters configured for the configured grant transmission is configured in configuredGrantConfig or SPS-config in 3GPP TS 38.331.

11. The data transmission method of claim 1, wherein the plurality of parameters configured for the dynamic transmission is configured in pusch-Config in 3GPP TS 38.331.

12. The data transmission method of claim 1, wherein the part of the plurality of parameters configured for the configured grant transmission comprises at least one of the following parameters in 3GPP TS 38.214: mcs-Table, mcs-TableTransformPrecoder, p0-NominalWithoutGrant, p0-PUSCH-Alpha, powerControlLoopToUse, pathlossReferenceIndex, transformPrecoder.

13. The data transmission method of claim 12, wherein the part of the plurality of parameters configured for the configured grant transmission consists of the following parameters in 3GPP TS 38.214: mcs-Table, mcs-TableTransformPrecoder, p0-NominalWithoutGrant, p0-PUSCH-Alpha, powerCon-trolLoopToUse, pathlossReferenceIndex, transformPrecoder.

14. The data transmission method of claim 12, wherein the part of the plurality of parameters configured for the configured grant transmission consists of the following parameters in 3GPP TS 38.214: mcs-Table, mcs-TableTransformPrecoder, p0-PUSCH-Alpha, powerControlLoopToUse, pathlossReferenceIndex, transformPrecoder.

15. The data transmission method of claim 13, further comprising: when the retransmission of the data is triggered by the UL grant, retransmitting the data using the plurality of parameters configured for dynamic transmission except for the part of the plurality of parameters configured for the configured grant transmission.

16. A data transmission device, separately configured by radio resource control (RRC) with a plurality of parameters configured for configured grant transmission and with a plurality of parameters configured for dynamic transmission which is triggered by uplink (UL) grant, comprising one or more processors and one or more memory storing program instructions, the data transmission device being adapted, when the program instructions are executed by the one or more processors, to perform operations including:

transmitting data using the plurality of parameters configured for configured grant transmission; and when retransmission of the data is triggered by UL grant, retransmitting the data using a part of the plurality of parameters configured for the configured grant transmission.

17. A non-transitory computer-readable storage medium storing program instructions that, when executed by one or more processors in a data transmission device separately configured by radio resource control (RRC) with a plurality of parameters configured for configured grant transmission and with a plurality of parameters configured for dynamic transmission which is triggered by uplink (UL) grant, cause the data transmission device to perform operations including:

transmitting data using the plurality of parameters configured for configured grant transmission; and when retransmission of the data is triggered by UL grant, retransmitting the data using a part of the plurality of parameters configured for the configured grant transmission.

* * * * *